(12) United States Patent
Gosalia

(10) Patent No.: US 11,171,951 B2
(45) Date of Patent: Nov. 9, 2021

(54) DEVICE INTERFACE OUTPUT BASED ON BIOMETRIC INPUT ORIENTATION AND CAPTURED PROXIMATE DATA

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 167 days.

(21) Appl. No.: 16/002,774

(22) Filed: Jun. 7, 2018

(65) Prior Publication Data

US 2019/0379657 A1 Dec. 12, 2019

(51) Int. Cl.
*H04L 29/06* (2006.01)
*H04W 12/06* (2021.01)

(52) U.S. Cl.
CPC ......... *H04L 63/0861* (2013.01); *H04W 12/06* (2013.01); *H04L 2463/082* (2013.01)

(58) Field of Classification Search
CPC .................................................. H04L 9/3231
See application file for complete search history.

(56) References Cited

U.S. PATENT DOCUMENTS

| | | | | |
|---|---|---|---|---|
| 4,135,147 A * | 1/1979 | Riganati | ............ | G06K 9/00006 382/125 |
| 5,095,194 A * | 3/1992 | Barbanell | .............. | G07C 9/257 235/379 |
| 5,869,822 A * | 2/1999 | Meadows, II | ..... | G06K 9/00067 235/380 |
| 9,678,571 B1 * | 6/2017 | Robert | .................. | G06F 3/0488 |
| 9,690,382 B1 * | 6/2017 | Moussette | ............. | G06F 3/0488 |
| 9,740,381 B1 * | 8/2017 | Chaudhri | ............. | G06F 3/0485 |
| 9,910,524 B1 * | 3/2018 | Wells | ..................... | G06F 1/1684 |
| 9,910,632 B1 * | 3/2018 | Morgan | .................... | G09G 5/12 |
| 10,223,710 B2 * | 3/2019 | Purves | ..................... | G06F 3/011 |
| 10,410,216 B2 * | 9/2019 | Hynes | ............. | G06Q 20/40145 |
| 10,438,176 B2 * | 10/2019 | Johnson | .............. | G06Q 20/322 |
| 10,666,780 B2 * | 5/2020 | Cho | ........................ | G06F 1/169 |
| 2003/0169910 A1 | 9/2003 | Reisman et al. | | |
| 2004/0068669 A1 | 4/2004 | Uchida | | |
| 2007/0118758 A1 | 5/2007 | Takahashi et al. | | |

(Continued)

FOREIGN PATENT DOCUMENTS

| WO | WO-2009-085338 | 7/2009 |
|---|---|---|
| WO | WO-2017-101212 | 6/2017 |

*Primary Examiner* — Dao Q Ho
(74) *Attorney, Agent, or Firm* — Haynes and Boone, LLP

(57) ABSTRACT

There is provided systems and methods for device interface output based on biometric input orientation and captured proximate data. A user may utilize a device to enter a fingerprint input to perform various device or application functionalities. The user may vary the orientation of the fingerprint to limit user interface data output, change the data that is output, or lock the interface from data output. Fake data may be output in specific instances, such as high risk of data misappropriation. The device may detect the orientation based on changes in the orientation of the grooves and ridges of a fingerprint with respect to an axis of the device, and may also detect additional data to determine what interface output is required. The additional data may include pressure of the fingerprint input and/or voice data. A second device may also provide user biometrics as the additional data.

20 Claims, 6 Drawing Sheets

(56) References Cited

U.S. PATENT DOCUMENTS

| | | | |
|---|---|---|---|
| 2008/0249856 A1* | 10/2008 | Angell | G06Q 30/02 705/14.67 |
| 2009/0076966 A1* | 3/2009 | Bishop | G07F 7/0866 705/67 |
| 2009/0226052 A1* | 9/2009 | Fedele | G06K 9/00046 382/125 |
| 2010/0106649 A1 | 4/2010 | Annan | |
| 2010/0216429 A1 | 8/2010 | Mahajan | |
| 2010/0312657 A1 | 12/2010 | Coulter et al. | |
| 2013/0029597 A1 | 1/2013 | Liu et al. | |
| 2013/0308838 A1* | 11/2013 | Westerman | G06K 9/0008 382/125 |
| 2014/0115694 A1* | 4/2014 | Fadell | G06F 3/0416 726/19 |
| 2014/0162598 A1* | 6/2014 | Villa-Real | G06Q 20/363 455/411 |
| 2014/0359757 A1* | 12/2014 | Sezan | G06F 21/32 726/19 |
| 2015/0049926 A1* | 2/2015 | Heilpern | G06K 9/00013 382/124 |
| 2015/0073907 A1* | 3/2015 | Purves | G06Q 20/32 705/14.58 |
| 2015/0074615 A1 | 3/2015 | Han et al. | |
| 2015/0106621 A1* | 4/2015 | Burke | G06Q 20/354 713/168 |
| 2015/0161837 A1 | 6/2015 | Smith et al. | |
| 2015/0172287 A1* | 6/2015 | Ortiz | G07C 9/25 726/7 |
| 2015/0278577 A1 | 10/2015 | Cho et al. | |
| 2015/0319294 A1* | 11/2015 | Sudhir | H04M 1/72541 455/411 |
| 2015/0347730 A1 | 12/2015 | Matus | |
| 2015/0363587 A1 | 12/2015 | Ahn et al. | |
| 2016/0042220 A1* | 2/2016 | Ju | H04L 63/0861 382/124 |
| 2016/0217310 A1 | 7/2016 | Shah et al. | |
| 2016/0239150 A1* | 8/2016 | Lee | G06F 3/017 |
| 2016/0283698 A1* | 9/2016 | Huang | G06F 3/04883 |
| 2016/0314334 A1* | 10/2016 | He | G06K 9/0004 |
| 2017/0012994 A1 | 1/2017 | Choi et al. | |
| 2017/0076132 A1* | 3/2017 | Sezan | G06K 9/00013 |
| 2017/0344782 A1* | 11/2017 | Andersson | G06F 21/32 |
| 2017/0357317 A1* | 12/2017 | Chaudhri | G06F 3/016 |
| 2018/0018501 A1* | 1/2018 | Mather | G06K 9/00107 |
| 2018/0070389 A1* | 3/2018 | Morgan | G09G 5/12 |
| 2018/0173930 A1* | 6/2018 | Han | H04W 12/06 |
| 2018/0322328 A1* | 11/2018 | Pang | A61B 5/68 |
| 2019/0392422 A1* | 12/2019 | Yim | G06Q 20/40145 |
| 2020/0241644 A1* | 7/2020 | Robert | G06F 3/0488 |

* cited by examiner

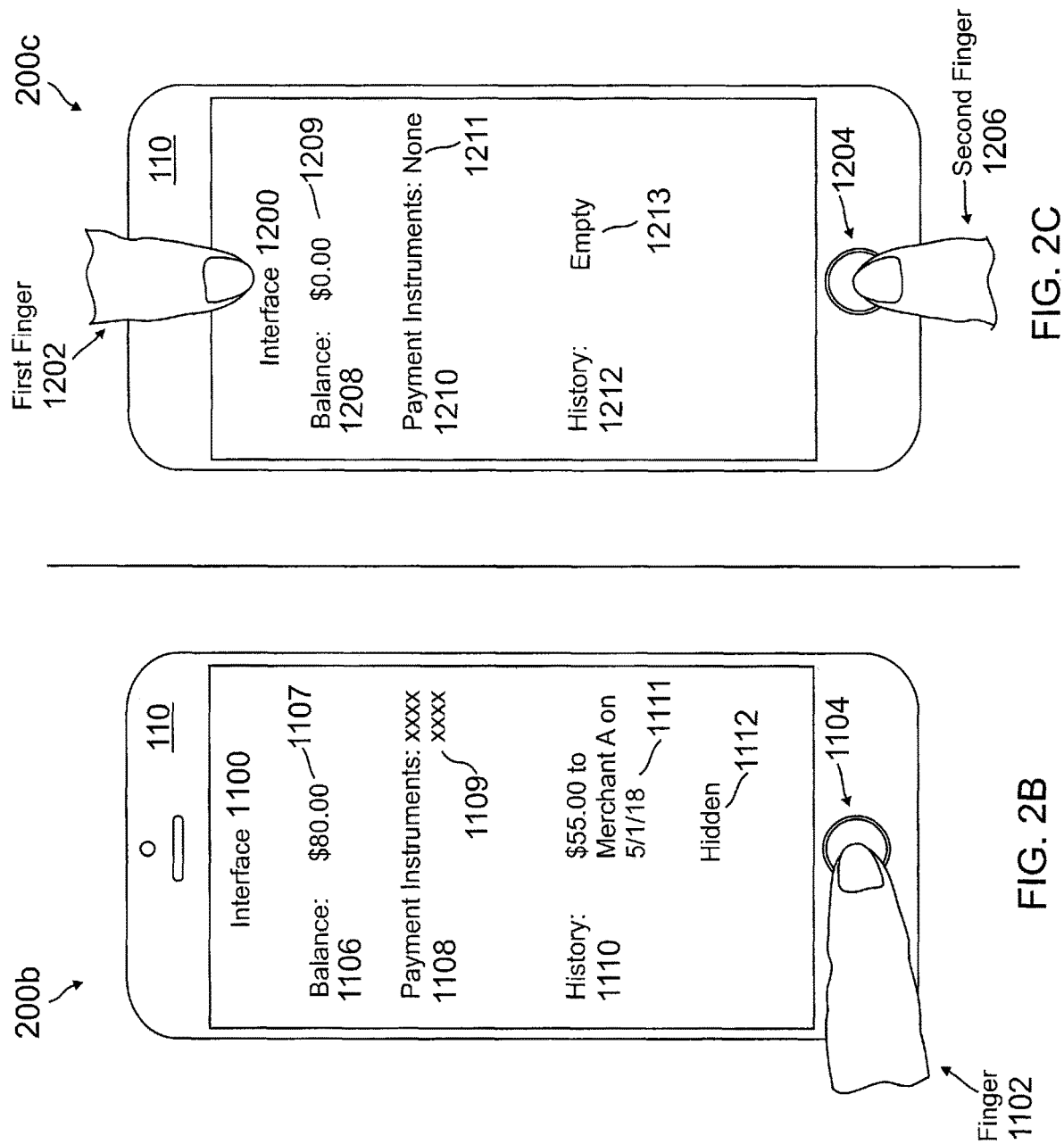

DEVICE INTERFACE OUTPUT BASED ON BIOMETRIC INPUT ORIENTATION AND CAPTURED PROXIMATE DATA

TECHNICAL FIELD

The present application generally relates to security and authentication through computing devices, and more specifically to changing displayed interface data based on a detected orientation of a fingerprint input and additional device detected data.

BACKGROUND

Users may utilize computing devices, such as mobile smart phones, that enable touch inputs to unlock the device, activate applications, and/or provide input during device use. Generally, a biometric input device (e.g., fingerprint scanner) is required to read fingerprint data, such as the lines, grooves, and/or curves that make up a fingerprint. Since fingerprints are unique to particular users, fingerprints have been used to perform user authentication using a biometric input device. This is beneficial since fingerprints can include more unique data points to be more secure and trustworthy over previous password or personal identification number (PIN) authentication processes, where known secrets may be determined through phishing schemes, keyloggers, malware, and/or brute force attacks. Once a fingerprint is read, a device/application may be unlocked and/or a user may be authenticated within the application to access data and services since fingerprints are trusted as an authentication source. However, if a user is forced to provide the biometric authentication under duress, a malicious party, such as a thief in a real-world scenario, may still be able to utilize the device to perform fraudulent transactions. Thus, devices are only sophisticated enough to identify and authenticate a user through a fingerprint, but are unable to determine whether a fingerprint authentication is truly valid or is being performed in a manner not authorized by the user (e.g., unknown input, under duress, etc.).

BRIEF DESCRIPTION OF THE DRAWINGS

FIG. 2B is an exemplary application interface having information hidden from view based on an orientation of fingerprint input, according to an embodiment;

FIG. 2C is an exemplary application interface displaying hidden and fake information based on an orientation of fingerprint input, according to an embodiment;

Figure 1:
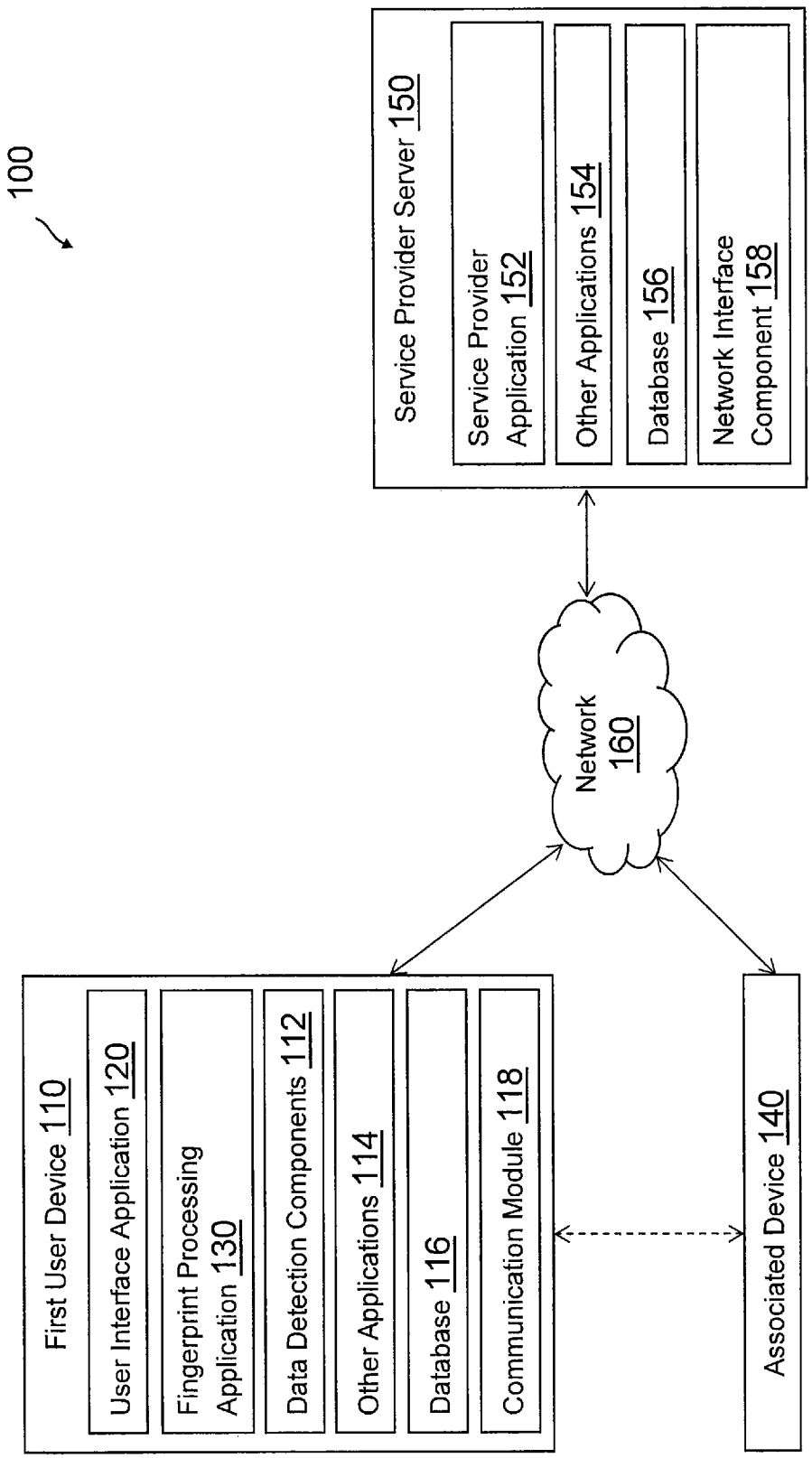
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for device interface output based on biometric input orientation and other data captured by a user device. Systems suitable for practicing methods of the present disclosure are also provided.

Biometric authentication may be used to provide additional security to computing device locking/unlocking, application usage, and/or electronic transaction processing by utilizing a more secure or unique authentication credential through a user fingerprint or other unique user biometric data (e.g., retinal scan, voice analysis, etc.). Modern computing devices may include a touch screen interface (e.g., a capacitive and/or resistive touch interface) and/or fingerprint scanner that may read a user's fingerprint and process the captured fingerprint. Since fingerprints are unique between users and include multiple varying and unique data points for analysis, fingerprints may provide a secure and difficult-to-break authentication mechanism. These input devices may be capable of determining the ridges and valleys within a fingerprint, such as through contact and/or light analysis, as well as the curvature and grooves of the ridges and valleys through a fingerprint. For example, a physical scanner may identify various minutiae and other data points within a fingerprint, such as where ridges and lines end, split, curve, or otherwise provide a distinctive feature. Additionally, distance between minutiae may be compared, as well as angles between features. The device may then compare this distinct feature data to previously stored data of a fingerprint to identify similarities and/or differences. By comparing particular distinctive data instead of an entire image of a fingerprint, processing time and power may be reduced. The stored fingerprint data may be protected through secure hardware platforms, cryptographic processes, or other secure system.

An optical scanner for a fingerprint may work by capturing an image of a fingerprint (similar to how a digital camera may capture an image) and comparing the unique patterns on the surface of the fingerprint to stored data through one or more algorithms. The unique patterns may be caused by the ridges and valleys forming curves in the image, which may be viewed through the contrasting light and dark from skin contact points of the ridges in the fingerprint. One or more LEDs within the scanner may serve to light up the fingerprint when capturing the image to contrast the ridges and valleys of the fingerprints curvature. Capacitive fingerprint scanners may also be used to capture fingerprint data, which may utilize an array of capacitor circuits (e.g., an array of small capacitor cells) to detect changes in a fingerprint's ridges when the fingerprint is placed over the scanner. An air gap caused by a valley may leave a charge unchanged, whereas the ridge may cause a difference in charge when in contact with the scanner. Capacitive sensing of a fingerprint may also occur with other device components, such as a touch screen interface of a mobile phone. Other types of fingerprint scanners may include ultrasonic scanners, which may utilize an ultrasonic pulse transmitted against the fingerprint when it is in contact with the scanner. The pulse may be absorbed by the fingerprint with some of the ultrasonic wave bounced back to the scanner. The scanner may then detect the details of the fingerprint using the returned wave and construct a three-dimensional model of the fingerprint.

A user may register an initial fingerprint with the system. This may include providing one or more fingerprint inputs to the device's scanner, and allowing the device to register the fingerprint. The device may then securely store the fingerprint, as well as the position, location, and/or orientation of entry of the fingerprint. That is, the device may store a fingerprint input that is provided in a certain base orientation, location, and/or position used by the user with their hand/finger when inputting the fingerprint for registration. After registration of an initial fingerprint, the device may utilize the fingerprint during normal course of use. For example, the fingerprint may be used to unlock and/or turn on the device, as well as lock and turn off in certain embodiments. The fingerprint may also be used to execute certain applications, as well as processes within the application. A secure application (or application process) requiring an authentication credential to open and/or use may utilize the user's fingerprint as the authentication credential. Additionally, secure data on the device or accessible from an online resource (e.g., cloud computing structure) may require a fingerprint to access, display, and/or use.

Thus, a device may utilize a fingerprint to unlock or access the device and perform various computing processes (e.g., application execution and/or in-application process). Additionally, an application may require a fingerprint to utilize particular data accessible by the application, including an account with an online service provider for electronic transaction processing. A service provider, such as PayPal® or other online payment and transaction processor, may provide payments and other services on behalf of users, merchants, and other entities. The service provider may provide payment accounts and/or payment processes to users that allow users to send and/or receive payments between the user and another user/merchant. For example, a user may wish to provide a payment for a transaction with a user/merchant, transfer money to another family/friend, engage in a transaction previously generated and provided to the user, initiate a transaction with another entity, or perform another process. A merchant may similarly send and/or receive payments between the merchant and another user/merchant, which may include receiving payment for transactions, providing payments to employees and/or for business expenses, transfer money between accounts, or perform further transaction processing. Other entities, such as charitable organizations and businesses, may also utilize the payment provider, for example, to receive donations from various parties and/or pay business expenses. The service provider may be utilized to perform such electronic transaction processing. Additionally, the online payment provider may provide payment accounts and digital wallet services, which may offer account services to send, store, and receive money, process financial instruments, and/or provide transaction histories. Such data may be accessible through an application and utilized by providing authentication credentials, which may include a user fingerprint registered for the account and/or application using the data.

The payment provider may further include additional transaction management services, as well as account services for use with the payment provider and accessible through a device application, such as a browser application, dedicated application of the payment provider, and/or other application (e.g., merchant application) utilizing the processes and features provided by the payment provider. However, in other embodiments, transaction processing service using the online payment provider and the digital wallet may be integrated into the merchant's website/dedicated application. The accounts of users may include personal, device, and financial information, as well as other information that may be determined by or requested from the payment provider. Additionally, the user may specify authentication credentials, such as a login name, password, personal identification number (PIN), and/or fingerprint for use of the account.

During device and/or application usage, various fingerprint authentications may be required to perform certain actions, such as unlocking the device, opening an application, accessing data, performing application process, and/or engaging in electronic transaction processing using an online account (or other online account usage, such as changing security settings, accessing secure data, etc.). In order to secure the device, the device's accessible data, and the device's applications, the device may further detect an orientation, placement, pressure, or location of a fingerprint when input to the device during use. For example, a thief or malicious party may force a user to enter their fingerprint, such as during a robbery or forceful threat (e.g., gun point). Another user may also cause a user to enter their fingerprint without the user's knowledge or without user intent. In such situations, another user may be provided unintended access to user data or functionality on the user device through fingerprint authentication. In another example, the user may want to only show certain data to certain individuals (e.g., a customer, a boss, an employee, a parent, a friend, or a family member) in order to prevent sensitive or confidential data from being output (e.g., prevent a merchant from viewing an account balance or payment instrument but show the merchant a completed transaction history paid to the merchant or show a friend a family member account information or pictures but prevent other data from being output). Thus, users may want the device to more intelligently output interface data when unlocking a device or application and/or executing an application process through fingerprint authentication.

In order to vary the interface data output, a user may change the orientation, pressure, length the finger is held against the reader, pressure changes during the fingerprint read, and/or other proximate/detectable data when entering a fingerprint and performing a fingerprint authentication process on the device. The change in the orientation of the fingerprint may be performed when entering the fingerprint on a fingerprint scanner (e.g., a "home" or unlock button/area on a mobile smart phone) or when placing the fingerprint on the touch screen interface. Changing the orientation may correspond to varying the orientation with respect to an axis of the device, such as a horizontal/vertical axis such that the fingerprint is rotated in a circular manner compared to an original position and/or acceptable position. The original position may be defined by the user when originally registering the user's fingerprint with the device, or may be a standard position, such as having a top (e.g., top of the finger) to bottom (e.g., near the knuckle or bend in the thumb/finger) orientation parallel to two side edges of a device and perpendicular to the top and bottom edges. The orientation may also be defined according to other set points, such as which hand is holding the device and the placement of the thumb or finger depending on the hand, where the touch interface/fingerprint scanner is located, or other data point. In such embodiments, the orientation may be defined according to the right or left hand that is used with the device (e.g., if a user is right or left handed and inputs a thumb in a specific position, such as parallel to the top and bottom edges of a phone when gripping the phone).

The user may define the base or original orientation when registering their fingerprint, and may also define a range or variance from the original orientation that constitutes an approved fingerprint input that provides a first access level to the device, application, and/or interface data output and display. The first access level may determine the device data that is output in one or more interfaces displayed by the device, as well as processes that are accessible through the interfaces (e.g., displayed that to execute one or more processes, such as an electronic transaction processing process in a payment application provided by a service provider). For example, if the fingerprint is input in an orientation acceptable for the first access level, such as a base orientation of the finger on a touch screen interface, fingerprint scanner, or other biometric reader, then the device may display data in one or more interfaces according to the data's availability for output set for the first access level. The fingerprint input may also be provided with additional data, such as a pressure, voice commands or audio data, location/position of the fingerprint on the device, and/or a motion of the finger when entering the fingerprint. This additional data may define whether the first access level is to be used to display interface data. This first access level may correspond to no restrictions on data output so that the device's interface would display data normally and without removing, restricting, or replacing any data output. This may correspond to a general unlocking of the device, opening of an application, and/or viewing/use in-application data and processes. However, the first access level may also include one or more restrictions that are established by the user, which may restrict interface data output, including hiding data, replacing data and/or displaying fake data in place of actual data, or restricting (e.g., censoring, blurring, etc.) interface data and/or access to processes displayed within an interface. The first orientation may also be set with an allowable range that the fingerprint input is allowed to vary from the first orientation, pressure, location, or position, such as a degree range for a rotational value outside of the first orientation (e.g., may differ by up to thirty degrees of rotation from the original orientation), or up to 5 Pa difference for a pressure value.

The user may also define additional orientations that cause specific interface data output and display, or the interface data that is displayed when the orientation of the fingerprint is outside of the original orientation and/or range for the original orientation. Input of a fingerprint in these orientations when unlocking the device, accessing data or an application, and/or performing a process may cause the device to provide one or more additional access levels to interface data display and/or access to device processes. For example, when the fingerprint is input in an orientation, pressure, location, or position that is different and/or out of the acceptable range for the original fingerprint input entry and registration, the device may limit or change data and/or application process availability, as well as interface data output. The fingerprint input may be put in so that it is rotated ninety or one hundred and eighty degrees such that it is in a different orientation, may be provided with a harder or softer pressure, or may be input on a different location or position on the device. Thus, a second access level that limits interface data output may be determined based on the orientation of the fingerprint input at that time, and may alter the output of interface data.

Thus, the device may determine what kind of interface data is displayed and hidden and how to lock/display the interface data based on the variance of the orientation, pressure, location, and/or position of the fingerprint input from the original position. In such embodiments, only partial data may be displayed in an interface and only certain options and processes may be accessible and used in the interface. Other data may be hidden or obscured from view, such as an account balance and/or payment instrument within a payment application. When in an invalid position, the device may prevent certain data output. The device may also change or display fake data and/or processes, which may include temporary data other than the normal application output data, false data, or partial data within the interface. For example, an account balance of zero may be shown, or payment instrument data may be falsified to protect the user's sensitive data. The user may wish to hide, obscure, or output fake data in order to prevent revealing particular data to family, friends, and/or merchants or allowing such people to access certain processes when viewing and/or using the user's device. The user may also want to fake or hide data from certain users such as thieves or robbers in an emergency or while under duress. Thus, the user may utilize the orientation of their fingerprint input to secretly indicate to the device that the device should only display certain data or display false data without having the other party suspect that the data or output has been altered. An emergency or critical situation may further be defined as occurring with additional biometric information, such as increased heart rate, voice commands, or location. Additionally, inadvertent access through a partial fingerprint input or a fingerprint input in an out-of-place orientation or location may also lead to the false or fake data to prevent inadvertently revealing application data.

In addition to entering a fingerprint in an orientation (or placement, location, pressure, etc.) that is outside of the acceptable orientation or range of orientation from the original orientation, particular orientations (or other input data) of the fingerprint may cause certain actions. Placing the user's fingerprint in a certain position, such as upside down as if the user were handing the phone to another user in a position that is inverted to the original user, may also define a further access level. This access level may also be determined based on the pressure of the finger when entering the fingerprint, as well as a heart rate, voice command, or location. The access level for such an input may indicate fraud, theft, or duress of the user that may require interface data output to be limited to prevent data misappropriation and/or fraudulent use of the device. Thus, the device may hide some or all interface data, may display false data, or may prevent certain processing from occurring using the device. The device may also contact a third party, such as a friend, family member, contact, or authority figure, and may provide certain information, such as a device location. For example, depending on the fingerprint capture (e.g., orientation, pressure, pressure changes, length of time, presence of a second user) and any other data detected by the device during an authentication process (e.g., heart rate, voice command, location), the device may access stored actions corresponding to the fingerprint capture data. In the above example, a certain orientation may correspond to the device automatically calling, texting, or emailing one or more specific individuals with a specific message. This may include contacting a trusted device of another user, which may be established by the user with the device and the fingerprint orientation. The individual(s) may also be determined on a location of the user and locations of the individuals, such that only those in close proximity (e.g., with a set distance) are contacted.

The device may also allow for certain processes to be executed, but mark the processes as potentially fraudulent for reversal later or otherwise later remedying. For example, the device may allow for or show a transfer or electronic transaction processing using a payment application to prevent harm to the user, but may reverse later or mark as fraudulent to remedy. Another orientation may indicate that the user is displaying the device to a merchant, for example, if the user has used their device to perform electronic transaction processing and wishes to display a receipt or transaction history to the merchant. However, if the fingerprint is input in this orientation at a different pressure than expected, the device may also detect additional data and attempt to capture and process proximate data. For example, the pressure of the input may indicate input made under duress. The user may register a "hard" input, such as one over 20 Pa as indicating duress or potential fraud, which may be used to input the inverted fingerprint. The device may also capture voice data, which may be processed to identify code words, particular words/text, and/or voice patterns to determine whether the user is using the device normally or in danger and under duress. Code words may be established by the user, such as "merchant payment" or "don't hurt me" to indicate particular situations (e.g., merchant payment or robbery respectively). The device may also identify particular words or phrases through voice analysis and/or voice-to-text processing. The device may also identify voice patterns, such as pitch or speed, to determine the specific interface output.

Moreover, other biometrics and/or data may be analyzed with the fingerprint orientation to determine the particular interface output when entering a fingerprint for authentication. The additional biometrics may include data detected by the device or another device, including heart rate, an amount or level of perspiration, or other user biometric. An increased heart rate may indicate a potentially dangerous situation, which may cause hiding of interface data if the fingerprint is input in a particular orientation. The location of the device and/or a time may also affect the output of the interface data. For example, a fingerprint entered in a particular orientation or outside of the acceptable range during normal work hours or home hours at a user's work/home is likely to be a mistake and unlikely to be indicating a fraudulent situation. However, a fingerprint input entered in the middle of the night at an unknown location may indicate fraud. The device may also analyze a motion of the fingerprint when entered, such as a drag feature or multiple taps, as well as ambient light around the device. The device may also access a crime map or crime statistics for the location to intelligently determine whether the particular fingerprint input is more or less likely to indicate potential fraud or theft. In the event that location information, biometrics (e.g., heart rate or perspiration level), voice commands, or other data indicates that the user is in a critical or emergency situation, a trusted device associated with the user's device may be contacted as discussed herein. For example, a parent, guardian, sibling, or spouse may receive a pop-up, email, or text message of the potential critical situation.

Thus, a user may enter a fingerprint biometric as an authentication credential during device use and application processing in particular ways to limit or vary device interface output. This increases device security and data protection, and further allows the user to secure device data in a less obvious and more secretive manner. Moreover, the device may utilize additional proximate data to make intelligent decisions on whether a fingerprint input indicates a potential request to vary interface data output. Therefore, the device's interface output may be more quickly changed and limited to prevent issues with theft and ease of use of fingerprint authentication.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first user device 110, an associated device 140, and a service provider server 150, in communication over a network 160. A user (not shown) may utilize first user device 110 to enter in a fingerprint authentication credential during device use. First user device 110 may analyze an orientation of the fingerprint input, such as a rotational degree difference from a registered original position, to determine what interface data may be displayed by first user device 110. First user device 110 may also capture additional data, including fingerprint input pressure, location, and/or position with respect to first user device 110. First user device 110 may also interact with associated device 140 and/or service provider server 150 to receive additional data, such as other user biometrics, crime information, location, etc. The additional data may be used to determine what interface data to display based on the input of the fingerprint by the user. First user device 110 may then output and/or change the output of an interface, which may include varying, changing, and/or hiding data displayed within the interface.

First user device 110, associated device 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First user device 110 may be implemented as a communication device that may utilize appropriate hardware and software configured for wired and/or wireless communication with associated device 140 and/or service provider server 150. For example, in one embodiment, first user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may be used and function similarly.

First user device 110 of FIG. 1 contains a user interface application 120, a fingerprint processing application 130, a data detection component 112, other applications 114, a database 116, and a communication module 118. User interface application 120 and other applications 114 may correspond to executable processes, procedures, and/or applications with associated hardware. In other embodiments, first user device 110 may include additional or different modules having specialized hardware and/or software as required.

User interface application 120 may correspond to one or more processes to execute software modules and associated devices of first user device 110 to provide data and processes output and usable through one or more user interfaces, which may be customized to change, hide, or alter the available data and/or processes within the interface based on a captured fingerprint. In this regard, user interface application 120 may correspond to specialized hardware and/or software of first user device 110 to output data through a user interface and allow users to view and/or utilize the data, for example, through one or more application processes. In certain embodiments, user interface application 120 may be used to initiate and/or generate transactions to purchase items, as well as request transaction processing through service provider server 150. User interface application 120 may be utilized by a user to view items for purchase from a merchant, including online merchant platforms or physical merchant locations, and select one or more items to purchase in a transaction. Once a transaction is generated, user interface application 120 may be used to request checkout and transaction processing for the transaction. In various embodiments, the merchant may provide checkout and payment processing using services provided by service provider server 150. Where the user has an account with service provider server 150 and/or uses a payment instrument that service provider server 150 processes with an online financial entity, such as a bank for a debit/credit card, user interface application 120 may utilize such account. User interface application 110 may also correspond to other types of applications, such as messaging, banking, social networking, or other application, including applications discussed in reference to other applications 114 of first user device 110.

User interface application 120 may provide one or more authentication mechanisms, including a biometric input option for a user's fingerprint. The authentication mechanism may be used to unlock first user device 110 and display a home page or operating system interface, open user interface application 120, authenticate the user for use of user interface application 120 or login to an account with user interface application 120, and/or execute a process or view data within user interface application 120. Thus, user interface application 120 may correspond to an operating system application that provides processes used with first user device 110 to secure first user device 110 and login to an account to use applications and processes of first user device 110. In various embodiments, user interface application 120 may correspond to a general browser application configured to retrieve, present, and communicate information over the Internet (e.g., utilize resources on the World Wide Web) or a private network. For example, user interface application 120 may provide a web browser, which may send and receive information over network 160, including retrieving website information, presenting the website information to the user, and/or communicating information to the website, including electronic communications and associated information. However, in other embodiments, user interface application 120 may include a dedicated application of service provider server 150 or other entity, which may be configured to send and receive electronic communications and engage in electronic transaction processing. Thus, the user associated with first user device 110 may utilize user interface application 120 to engage in transactions with the merchant/seller.

User interface application 120 may be used to output data, which may include account data for an account established using user interface application 120. User interface application 120 may be used to establish the account, as well as application and/or account settings for user interface application 120. To establish the account and/or set application settings, the user associated with first user device 110 may provide user information (e.g., name, shipping address, birthdate, and/or other consumer specific information) and/or financial information (e.g., a financial account, shipping address, etc.). The user may then establish account authentication credentials, such as a user name, password, PIN, and/or fingerprint. The fingerprint may be provided with an initial or original orientation used to set the fingerprint as an authentication mechanism. User interface application 120 may access the account and/or execute one or more processes using the account through entry of the authentication credentials. Thus, an interface may be displayed during use of user interface application 120, for example, during electronic transaction processing and completing the checkout process. User interface application 120 may communicate the user and/or financial information to service provider server 150 during the checkout process, where a secure communication channel (e.g., secure TCP/IP communications between first user device 110 and service provider server 150) may be established to transmit the information to service provider server 150. The secure communication channel may be established for the checkout process to transmit data entered to one or more fields of the checkout interface. In order to access such processes, display data, and/or otherwise use first user device 110, fingerprint processing application 130 may first determine an orientation of a fingerprint entered to the device to authenticate the user, as well as the interface data to output depending on the fingerprint orientation (including additional captured data).

Fingerprint processing application 130 may correspond to one or more processes to execute software modules and associated devices of first user device 110 to capture biometric fingerprint data for a user's fingerprint, determine the orientation of the fingerprint (as well as pressure, location, placement, and/or additional data provided with the fingerprint), and adjust the data, content, or processes presented to or made available through the device. In this regard, fingerprint processing application 120 may correspond to specialized hardware and/or software utilized by a user to compare a receiver fingerprint input during use of first user device 110 to a stored fingerprint to determine the orientation of the fingerprint. Fingerprint processing application 130 may then determine interface data to output, change, or hide based on the fingerprint orientation, as well as other data associated with the fingerprint input, including pressure, location, position, movement, ambient light, device location, voice data, or other fingerprint input and/or proximate data. The fingerprint's original orientation may be set with fingerprint processing application 130, or with user interface application 120. After establishing a base fingerprint, as well as associated data (e.g., position, location, device location, pressure, etc.), fingerprint processing application 130 may also receive other configurations and/or settings for fingerprint inputs to first user device 110 that may vary interface data output based on the change in the fingerprint input.

Fingerprint processing application 130 may receive a range of orientations of the fingerprint that is acceptable for entry of the original fingerprint, including a range of pressures, locations, or other data. An access level for interface data display may also be set with the original orientation, such as an access level to display interface data normally (e.g., a full access level to interface data output). Fingerprint processing application 130 may also receive one or more other orientations (as well as other fingerprint input data) that define other access levels, such as orientations set with access levels to hide interface data, change interface data, or prevent access to processes through the interface. For example, a fingerprint input setting may request that particular interface data is hidden, changed, or faked based on a user entering a fingerprint in a specific orientation when performing an authentication and/or performing a process with a touch input on first user device 110.

Fingerprint processing application 130 may then use fingerprint analysis (e.g., by examining minutiae found within fingerprint grooves, valleys, and curves to identify and match fingerprints) to determine an orientation of entry of the fingerprint. If a fingerprint is identified as the user associated with first user device 110, that is if the fingerprint can be identified as an authentication credential and is not a fingerprint of another, examination of the orientation of the minutiae within the fingerprint may be used to determine how the finger and fingerprint was oriented when being entered to first user device 110's fingerprint scanner. Fingerprint processing application 130 may also capture additional data, such as a pressure of entry of the fingerprint, location or position on first user device 110, or data around first user device 110 (e.g., a device location, voice data, light, etc.). Using the fingerprint's orientation, the other detected data, and the settings for interface data output based on the fingerprint input and other data, fingerprint processing application 130 may change the output parameters for one or more interfaces displayed by user interface application 120 so that output of the interface is altered based on the fingerprint input. Thus, fingerprint processing application 130 may interface with an application programming interface (API) of user interface application 120 to cause changes to interface output display within user interface application 120 based on one or more fingerprint input settings.

Fingerprint processing application 130 may further transmit a notification to another device based on the fingerprint orientation, as well as the additional detected data. For example, a fingerprint input in a particular orientation, and/or with a particular pressure, heart rate, device location, and/or voice command, may trigger fingerprint processing application 130 to transmit a notification to a trusted device or another nearby device. The nearby device may be within a geo-fence of the user, while trusted devices may be designated by the user with fingerprint processing application 130, such as a device of a spouse, guardian, or other known user.

In certain embodiments, one or more of the processes of user interface application 120 and fingerprint processing application 120 may be provided within the same application to provide their respective processes discussed above within a single application.

Data detection component 112 may correspond to one or more data detection components configured to detect data as discussed herein. In this regard, data detection component 112 may include one or more on-device data detection components that may be used to detect touch and fingerprint inputs to a touch screen interface and/or fingerprint scanner (e.g., an optical, capacitive, or ultrasonic fingerprint scanner). Data detection components 112 may therefore read a fingerprint so that one or more processing applications may determine a user identification and/or authentication using the fingerprint. Data detection component 112 may also be used to identify the orientation of entry of the fingerprint by capturing the fingerprint image with respect to an axis, side, or other reference point of first user device 110. Data detection component 112 may capture additional data with entry of a touch or fingerprint input, such as a pressure of the input and/or a location/position of the input on first user device 110. Data detection component 112 may also include or correspond to one or more microphones capable of detecting and receiving voice data. Data detection component 112 may also include GPS components, a light sensor, a camera, or other component capable of detect data around first user device 110 during entry of a touch/fingerprint input.

In various embodiments, first user device 110 includes other applications 114 as may be desired in particular embodiments to provide features to first user device 110. For example, other applications 114 may include security applications for implementing client-side security features, programmatic client applications for interfacing with appropriate application programming interfaces (APIs) over network 160, or other types of applications. Other applications 114 may also include additional communication applications, such as email, texting, voice, and IM applications that allow a user to send and receive emails, calls, texts, and other notifications through network 160. In various embodiments, other applications 114 may include financial applications, such as banking, online payments, money transfer, or other applications, which may be utilized to maintain a user account with service provider server 150. Other applications 114 may also include other location detection applications, such as a mapping, compass, and/or GPS application, which may be used to determine a location for first user device 110. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user. Thus, other applications 114 may include one or more applications that may be in communication with fingerprint processing application 130 through one or more APIs to adjust, change, or hide interface data during interface display and output.

First user device 110 may further include database 116 stored in a transitory and/or non-transitory memory of first user device 110, which may store various applications and data and be utilized during execution of various modules of first user device 110. Database 116 may include, for example, IDs such as operating system registry entries, cookies associated with user interface application 120 and/or other applications 114, IDs associated with hardware of first user device 110, or other appropriate IDs, such as IDs used for payment/user/device authentication or identification. Database 116 may store information for authentication of an account, such as identifiers, tokens, cookies, and/or authentication provided to first user device 110 from service provider server 150. Additionally, fingerprint data for a fingerprint authentication process may be stored in database 116. This data may include a fingerprint image, minutiae data, and/or other processed data from a fingerprint that may be used to identify a user's fingerprint for authentication, as well as determine an orientation of the fingerprint. Interface access level data for interface display and output may be stored in database 116, including fingerprint orientation and other data to trigger the access level and settings or configurations for interface output depending on the access level.

First user device 110 includes at least one communication module 118 adapted to communicate with associated device 140 and/or service provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Associated device 140 may be implemented as a communication device that may utilize appropriate hardware and software configured for wired and/or wireless communication with first user device 110 and/or service provider server 150. For example, in one embodiment, associated device 140 may be implemented as a personal computer (PC), a smart phone, a laptop/tablet computer, a wristwatch with appropriate computer hardware resources, eyeglasses with appropriate computer hardware (e.g. GOOGLE GLASS™), other type of wearable computing device, implantable communication devices, and/or other types of computing devices capable of transmitting and/or receiving data, such as a FITBIT™.

Associated device 140 may correspond to a device associated with first user device 110 and used by the user of first user device 110 (e.g., an owner of first user device 110), which may utilize appropriate hardware and software configured for wired and/or wireless communication with at least one of first user device 110 and/or service provider server 150. For example, associated device 140 may be communicatively coupled to first user device 110 through short range wireless communications. Associated device 140 may include short range wireless communication components, which may utilize short range wireless communications to communicate with first user device 110 (e.g., over Bluetooth Low Energy, LTE Direct, WiFi, radio frequency, infrared, Bluetooth, near field communications, etc.). In other embodiments, associated device 140 may further include network communication components and be capable of transmitting and/or receiving information from service provider server 150. Associated device 140 may be used to determine biometrics for the user and communicate the biometrics to first user device 110, which may affect whether one or more limitations should be imposed on interface data or processes of first user device 110.

For example, associated device 140 may also monitor user biometrics of the user, for example, if the user is in duress, is asleep, is awake, is in an agitated state, or is in movement. Such data may be used to determine user data that may affect interface data output on first user device 110. Associated device 140 may therefore include a sensor or other component used to collect the information associated with the user, such as an input device, a camera, a microphone, an accelerometer, a motion detector, an environmental sensor, and/or a biometric sensor. The current information may correspond to biometric data, which may correspond to biometrics of the user (e.g., heart rate, perspiration, etc.) and/or activity (e.g., steps taken, distance travelled, exercise performed, etc.). Associated device 140 may store the biometric activity data, or may transmit the biometric activity data on first user device 110 and/or service provider server 150 using the communication component. Associated device 140 may include display devices, including GUI's capable of displaying information to users. Associated device 140 may also include other output devices, including speakers. Associated device 140 may include input devices, including touch screens.

Service provider server 150 may be maintained, for example, by a transaction processing service provider, which may include payment processing providers and other type of financial service providers. In this regard, service provider server 150 includes one or more processing applications which may be configured to interact with first user device 110, associated device 140, and/or another device/server to facilitate transaction processing and interface data output. In one example, service provider server 150 may be provided by PAYPAL®, Inc. of San Jose, Calif., USA. However, in other embodiments, service provider server 150 may be maintained by or include another service provider that may provide services and/or data accessible through first user device 110.

Service provider server 150 of FIG. 1 includes a service provider application 152, other applications 154, a database 156, and a network interface component 158. Service provider application 152 and other applications 154 may correspond to executable processes, procedures, and/or applications with associated hardware. In other embodiments, service provider server 150 may include additional or different modules having specialized hardware and/or software as required.

Service provider application 152 may correspond to one or more processes to execute modules and associated specialized hardware of service provider server 150 to provide a service to first user device 110, which may be accessed through one or more applications of first user device 110, and provide data and/or executable processes to interact with service provider application 152 through application interfaces displayable by first user device 110. In this regard, service provider application 152 may correspond to specialized hardware and/or software to receive a communication request from first user device 110 and respond to the communication request, for example, by serving data to first user device 110 displayable through application interfaces. Depending on the orientation of a fingerprint input (and other data), data provided by service provider application 152 may be altered, changed, or hidden in the interfaces displayed by first user device 110. In this regard, data requests sent to service provider application 152 and/or data transmissions to first user device 110 may be changed based on the displayable data within the interface. However, in other embodiments, first user device 110 may hide, change, or affect display of the data directly where service provider application 152 is not used to manipulate interface data output.

In certain embodiments, service provider application 152 may be used to receive and/or transmit information from first user device 110 for establishing accounts and digital wallets, as well as processing and completing of one or more transactions initiated by the user and using the payment account, for example, through use of the digital wallet having one or more stored payment instruments. The user associated with first user device 110 may establish a payment account with service provider application 152 by providing personal and/or financial information to service provider server 150 and selecting an account login, password, and other security information, including a fingerprint authentication credential. In various embodiments, the financial information may include payment instrument information, such as account numbers. The user may directly provide the required account information, for example, during an account setup process. Service provider application 152 may then use the account for transaction processing. The account may be used to send and receive payments. The payment account may be accessed and/or used through a browser application and/or dedicated payment application executed by first user device 110. Service provider application 152 may receive a payment request from first user device 110 for a transaction between the user and the merchant, which may include identifiers, tokens, or other data used for transaction processing. Service provider application 152 may provide payment to the merchant using the payment instrument, and may provide a transaction history to first user device 110 and/or associated device 140, or store the history with one or more accounts. Thus, the account may be used as a payment instrument by service provider server 150 for transaction processing. Additionally, data for the account and/or during electronic transaction processing may be changed or hidden in an interface displayed by first user device 110 depending on fingerprint input data when authenticating the user for use of the application, account, and/or first user device 110.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 160, or other types of applications. Other applications 154 may contain software programs, executable by a processor, including a graphical user interface (GUI), configured to provide an interface to the user when accessing service provider server 150. In various embodiments where not provided by service provider application 152, other applications 154 may include connection and/or communication applications.

Additionally, service provider server 150 includes database 156. As previously discussed, one or more of a user and a seller may establish a payment account including a digital wallet with service provider server 150. Accounts in database 156 may include entity information, such as name, address, birthdate, payment/funding information, additional user financial information, and/or other desired user data. An entity may link to their respective accounts through an account, user, merchant, and/or device ID, as well as a generated token/cookie, which may be provided to first user device 110 and/or associated device 140 for use. Additionally, authentication information may be stored in database 156, such as a fingerprint authentication credential (e.g. fingerprint image, minutiae detail, etc.), along with associated actions based on how the fingerprint is entered, including orientation and pressure.

In various embodiments, service provider server 150 includes at least one network interface component 158 adapted to communicate first user device 110 and/or associated device 140 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
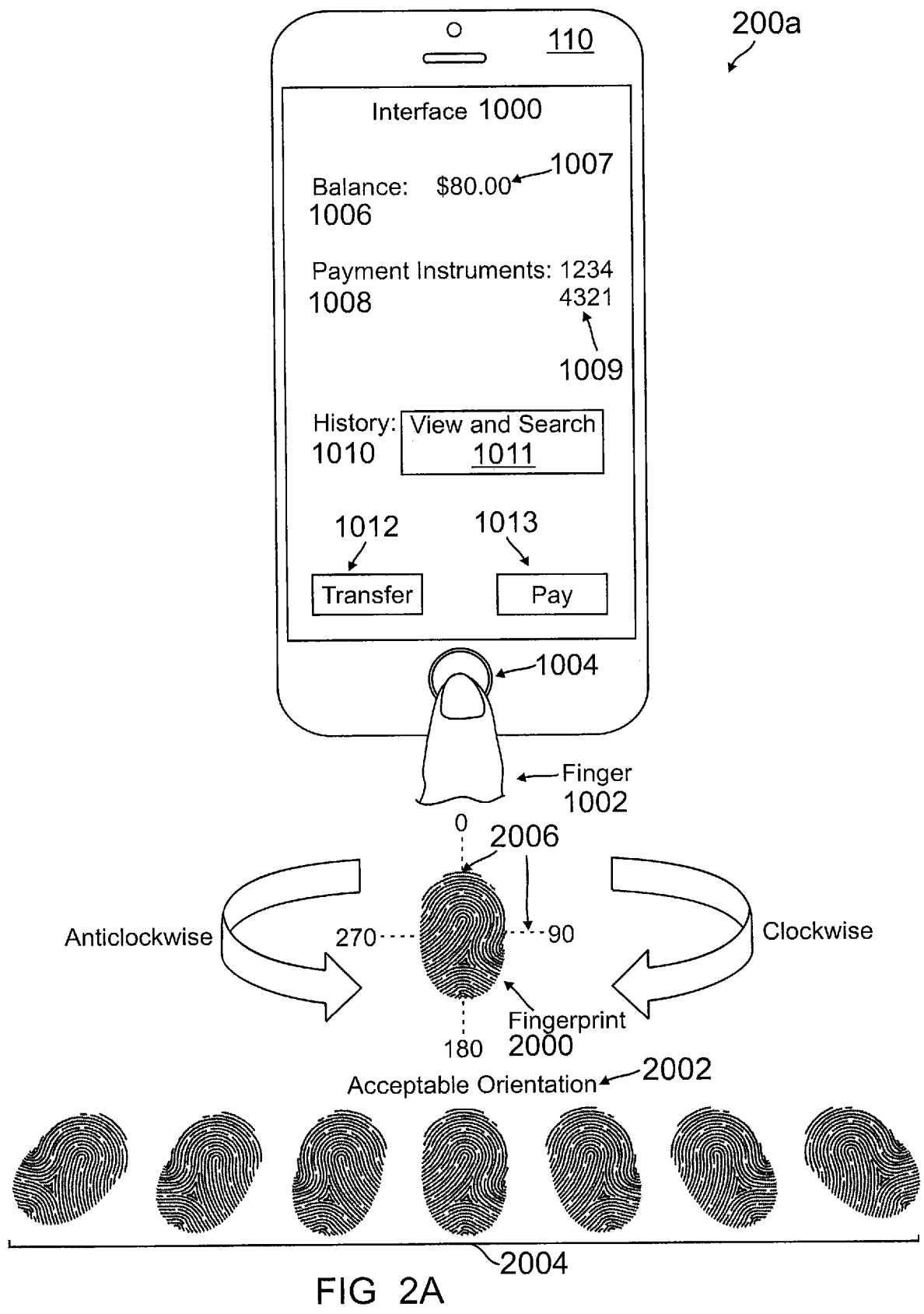
FIG. 2A is an exemplary application interface and fingerprint orientation for acceptable fingerprint inputs for interface data display, according to an embodiment, according to an embodiment.

FIG. 2A is an exemplary application interface and fingerprint orientations for acceptable fingerprint inputs for interface data display, according to an embodiment, according to an embodiment. Environment 200a of FIG. 2A includes an exemplary application interface that is displayed in response to input of a fingerprint for biometric authentication of a user. In this regard, environment 200a displays an interface 1000 of first user device 110 discussed in reference to system 100 of FIG. 1. Interface 1000 displays interface data and accessible processes executable by first user device 110 through interface 1000 without hiding or changing data based on a finger 1002 providing a fingerprint for biometric authentication in an acceptable original or defined position for authentication.

Interface 1000 includes interface data that may be displayed in response to authenticating the user providing the fingerprint input using finger 1002 on a fingerprint scanner 1004 (e.g., a home or lock/unlock button on a mobile phone or tablet computer that has a fingerprint scanner). Interface data of interface 1000 is not altered, changed, or hidden from a base accessibility provided through the application. This is due to finger 1002 providing the fingerprint input for authentication within a range that is acceptable for an original authentication position. For example, finger 1002 on fingerprint scanner 1004 is shown as providing fingerprint 2000 that is within an acceptable orientation 2002. As shown with acceptable fingerprint inputs 2004, fingerprint 2000 matches at least one of acceptable fingerprint inputs 2004. That is, fingerprint 2000 is within the rotational range with respect to X and Y axes 2006 so that fingerprint 2000 is within acceptable orientation 2002.

Since fingerprint 2000 is within acceptable orientation 2002, interface 1000 displays interface data without hiding, restricting, or falsifying any data to prevent theft, fraud, or misappropriation. Interface 1000 displays a balance 1006 showing a true account balance 1007 of $80.00. Additionally, payment instruments 1008 are populated with available instruments 1009 that may be used for electronic transaction processing, along with instrument data. A transaction history 1010 may allow for a view and search option 1011 that may allow the user to browse their transaction history of processed electronic transactions using the application associated with interface 1000. Interface 1000 further displays options for processes executable through interface 1000, such as a transfer process 1012 and a pay process 1013.

FIG. 2B is an exemplary application interface having information hidden from view based on an orientation of fingerprint input, according to an embodiment. Environment 200b of FIG. 2B includes an exemplary application interface that is displayed in response to input of a fingerprint for biometric authentication of a user. In this regard, environment 200b displays an interface 1100 of first user device 110 discussed in reference to system 100 of FIG. 1. Interface 1100 displays interface data and accessible processes executable by first user device 110 through interface 1100 after entering the fingerprint in an orientation that causes activation of an access level to restrict interface data output.

Interface 1100 of first user device 110 is shown as having particular restricted data based on entry of a fingerprint that is outside of acceptable orientation 2002 in environment 200a of FIG. 2B. Instead, finger 1102 is shown as located over fingerprint scanner 1104 in a sideways manner so that finger 1102 does not provide the fingerprint input to fingerprint scanner 1104 in one of the acceptable fingerprint inputs 2004 of environment 200a. In response to providing a fingerprint to fingerprint scanner 1104 in the manner that finger 1102 is currently applying in environment 200b, first user device 110 may execute one or more processes based on an access level associated with the orientation of finger 1102 and the fingerprint to alter or restrict data output in interface 1100. For example, a balance 1106 continues to show an account balance 1107 of $80.00. However, payment instruments 1108 show hidden data 1109 that does not display payment card or instrument information. Additionally, a history 1110 is edited to only show a last history 1111 of a payment of $55.00 to a merchant A on May 1, 2018. Thus, data has been altered to prevent display of additional confidential or secure data. Moreover, other processes 1112 are shown as hidden to prevent use. Other data, such as a pressure or location of finger 1102 may also affect data output on interface 1100, as well as environmental data proximate to first user device 110, such as a location, voice data, light level, etc.

FIG. 2C is an exemplary application interface displaying hidden and fake information based on an orientation of fingerprint input, according to an embodiment. Environment 200c of FIG. 2C includes an exemplary application interface that is displayed in response to input of multiple different fingerprints and a user's fingerprint in an orientation that indicates entry under duress for possible theft or fraud. In this regard, environment 200c displays an interface 1200 of first user device 110 discussed in reference to system 100 of FIG. 1. Interface 1200 displays interface data and accessible processes executable by first user device 110 through interface 1200 after entering the fingerprint in an orientation that causes activation of an access level that restricts all data access and provides fake data to prevent misappropriation of data, theft, and/or fraudulent transaction processing.

Interface 1200 of first user device 110 is shown as having all data restricted based on entry of a fingerprint that is in an "upside down" or inverted position and located elsewhere on first user device 110. In this regard, first finger 1202 may correspond to a finger of a user that owns or is in control (e.g., associated with) first user device 110. A second finger 1206 from a different user may be attempting to use, access, or request interface display on a fingerprint scanner 1104, such as a home screen. In environment 200c, a second user associated with second finger 1206 may be attempting to steal first user device 110 or cause the first user to open first user device 110 and allow the second user to perform fraudulent transaction processing, such as if the second user is robbing the first user. First finger 1202 may provide a fingerprint input to a touch screen interface that outputs interface 1200, such as a capacitive touch screen of a mobile device. First user device 110 may read that the orientation and placement of first finger 1202 indicates an emergency or theft situation, and further that an unknown fingerprint from second finger 1206 is simultaneously attempting to use the device. This may also be caused by inadvertent access when handing first user device 110 to another or picking up first user device 110. In other embodiments, not all fingerprints from first finger 1202 and second finger 1206 are required. Based on the fingerprint input(s) and the orientation/placement of first finger 1202 when providing the input, first user device 110 may protect interface data output in interface 1200 by hiding all data and falsifying data to make it appear that the data is unavailable and funds cannot be accessed or used in interface 1200. For example, a balance 1208 shows a fake balance 1209 of $0.00. Payment instruments 1210 are shown as blank 1211 so that it appears as if none have been entered. Similarly, a history 1212 is shown as empty 1213 to appear as if the application outputting interface 1200 is unused. Thus, first user device 110 may protect the data security of interface 1200 through the specific orientation of entry of a fingerprint from first finger 1202. Thus, the fake data may be temporary data other than the normal interface output, false data, or partially displayed and/or hidden interface data.

Figure 3:
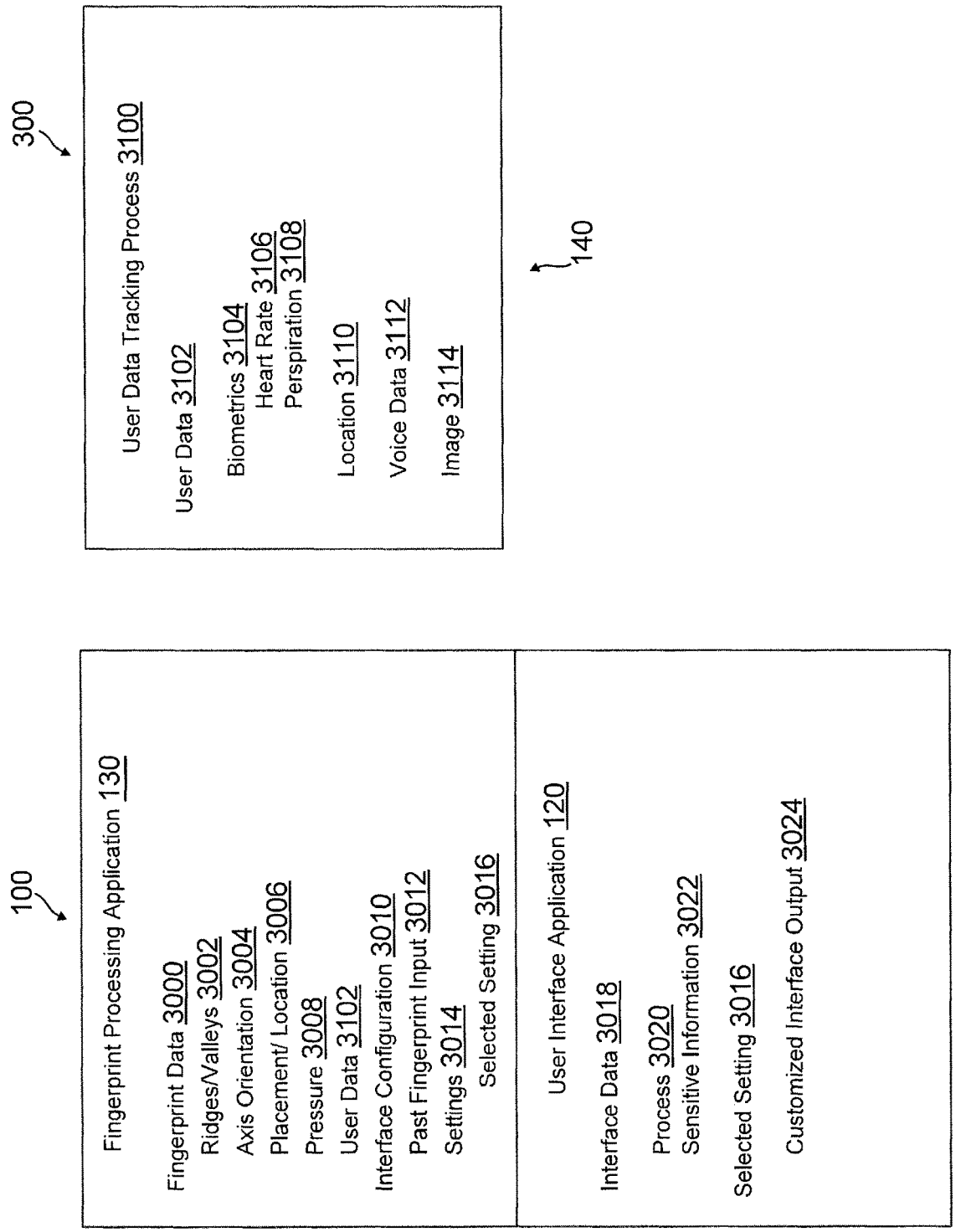
FIG. 3 is a block diagram of an exemplary computer system environment having two devices interacting to determine device interface output depending on fingerprint orientation during biometric authentication and other data, according to an embodiment.

FIG. 3 is a block diagram of an exemplary computer system environment having two devices interacting to determine device interface output depending on fingerprint orientation during biometric authentication and other data, according to an embodiment. Environment 300 of FIG. 3 includes first user device 110 and associated device 140 as discussed in reference to system 100 of FIG. 1. In this regard, first user device 110 executes user interface application 120 and fingerprint processing application 130 having the processes and features discussed in reference to system 100 of FIG. 1.

For example, fingerprint processing application 130 may process a fingerprint input for an authentication mechanism and determine, based on the fingerprint data and other detected data, an access level to interface data display provided in an interface of user interface application 120. Fingerprint processing application 130 includes fingerprint data 3000, which may be processed using a fingerprint authentication process to determine ridges/valleys 3002. Ridges/valleys 3002 may define minutiae of the fingerprint, such as curvature of lines, distance between reference points, and angle of reference points to each other. Using these minutiae, an axis orientation 3004 may be determined, which may correspond to an orientation of the fingerprint in reference to an axis, boundary, or point of reference on first user device 110. Additionally, placement/location 3006 may comprise additional data with pressure 3008 to determine the exactly input of the fingerprint.

Fingerprint processing application 130 may further detect user data 3012 when receiving the fingerprint input. Associated device 140 may include one or more components or processes to detect user data 3102. For example, a user data tracking process 3100 may detect user data 3012, including biometrics 3104 (e.g., heart rate 3106 and/or perspiration 3108), location 3110, voice data 3112, and/or an image 3114 of a surrounding of first user device 110 and/or associated device 140. Using the aforementioned data, fingerprint processing application 130 may determine an interface configuration 3010 based on an access level determined using fingerprint data 3000. Interface configuration 3010 may be determined in reference to past fingerprint input 3012 and settings 3014, such as a selected setting 3016 for the particular data in fingerprint data 3000. Fingerprint processing application 130 may utilize interface configuration 3010 to affect interface data 3018 of user interface application 120. Interface data 3018 may include a process 3020 accessible through an interface displayed using interface data 3018, as well as sensitive information 3022 that may be displayed. Based on selected setting 3016, a customized interface output 3024 may be displayed that may hide, alter the appearance, or change process 3020 and/or sensitive information 3022 in the interface.

Figure 4:
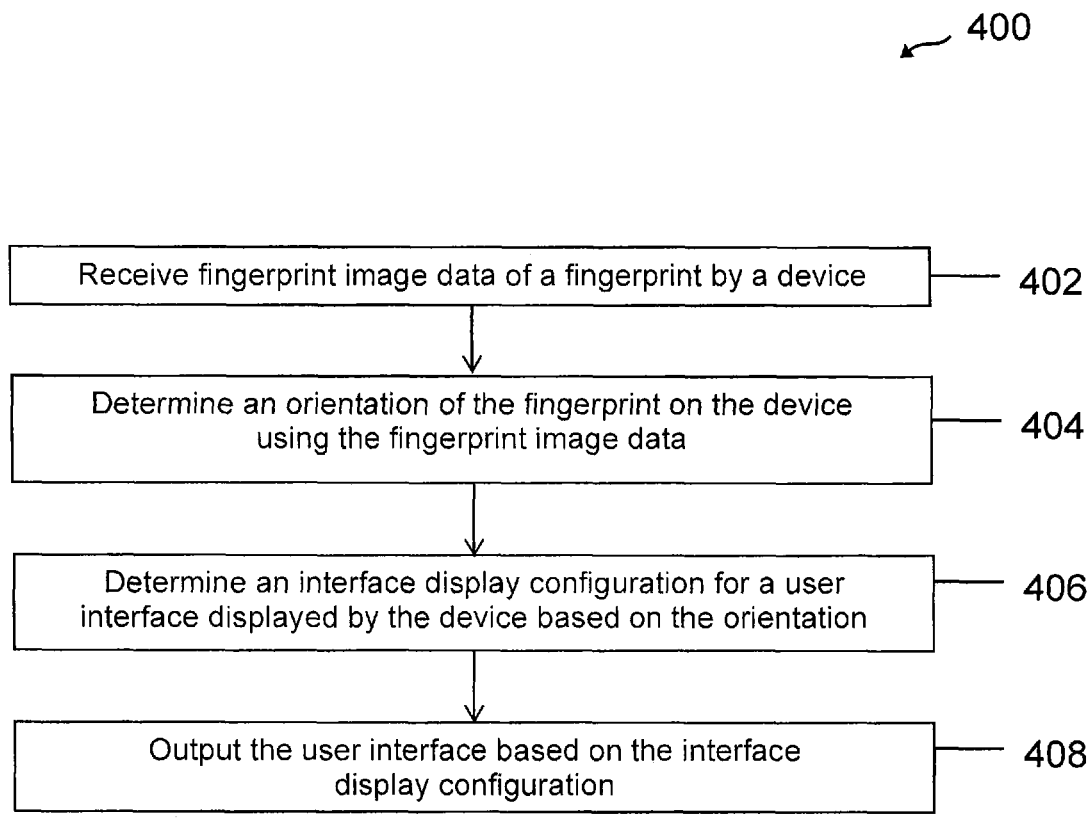
FIG. 4 is an exemplary process flowchart for device interface output based on biometric input orientation and captured proximate data, according to an embodiment.

FIG. 4 is an exemplary process flowchart for device interface output based on biometric input orientation and captured proximate data, according to an embodiment. Note that one or more steps, processes, and methods described herein with reference to flowchart 400 in FIG. 4 may be omitted, performed in a different sequence, or combined as desired or appropriate.

At step 402 of flowchart 400, fingerprint image data of a fingerprint is received by a device, for example, using a fingerprint scanner or biometric capture device. The fingerprint scanner/biometric capture device may comprise one of a home screen button having an image capture device, a touch screen interface of the user device system, or an ultrasonic capture device. An orientation of the fingerprint on the device is determined using the fingerprint image data, at step 404 of flowchart 400. In order to determine the orientation of the fingerprint, a map of the fingerprint may be generated using the image data and the map of the fingerprint may be compared to stored fingerprint data associated with a user of the user device system, wherein the orientation is determined based on the comparing. The map of the fingerprint may comprise curvature information of ridges and grooves of the fingerprint, and wherein the orientation is determined based on the curvature information.

At step 406 of flowchart 400, an interface display configuration for a user interface displayed by the user device is determined based on the orientation. Prior to this, it may be determined that the orientation of the fingerprint is within an acceptable or first range of orientations, wherein the interface display configuration provides full data access through the user interface based on the determination that the orientation is within the range. In other embodiments, the interface display configuration prevents access to data through the user interface based on the determination that the orientation is within the range, such as a security feature range. Conversely, it may be determined that the orientation of the fingerprint is outside of a range of acceptable orientations, wherein the interface display configuration provides partial data access through the user interface based on the determination that the orientation is outside the range. Moreover, an alert to a second device may be transmitted based on the orientation of the fingerprint being within the range or outside the range.

Additionally, the device may connect to a wearable computing device associated with a user of the user device system and user data for the user may be determined using the wearable computing device. Thus, the interface display configuration may further be determined based on the user data. A pressure of the fingerprint may also be determined, which may affect the interface display configuration that is determined. Voice data may also be detected using a microphone of the user device system, wherein the interface display configuration is further determined based on the voice data. The voice data may comprise a voice command. Thus, a requested action for the interface display configuration may be identified based on the voice command, wherein the user interface is output based on the requested action. The device may activate at least one additional device component in order to capture the aforementioned additional data, which may further include a location of the device, an image, the voice data, a pressure applied to the device, a heart rate of a user associated with the device, or a perspiration amount of the user, etc.

At step 408 of flowchart 400, the user interface is output based on the interface display configuration. In user interface may display false data, for example, in an application providing electronic transaction processing. In such embodiments, an electronic transaction processing request within the application may be received using the false data, and an application interface within the application may be presented based on the processed false data. This may cause alerting of an entity associated with the application of the false processing using the false data. This may occur in result from receiving a second fingerprint image of a second fingerprint on the device within a predetermined time of the first fingerprint image of the first fingerprint. If the second fingerprint is unknown, the device may be locked and the false data may be displayed. Another device may also be alerted of the false data or other action taken, which may be one of a plurality of devices associated with a group of users designated by a user of the first device or by a service provider associated with the first device.

Figure 5:
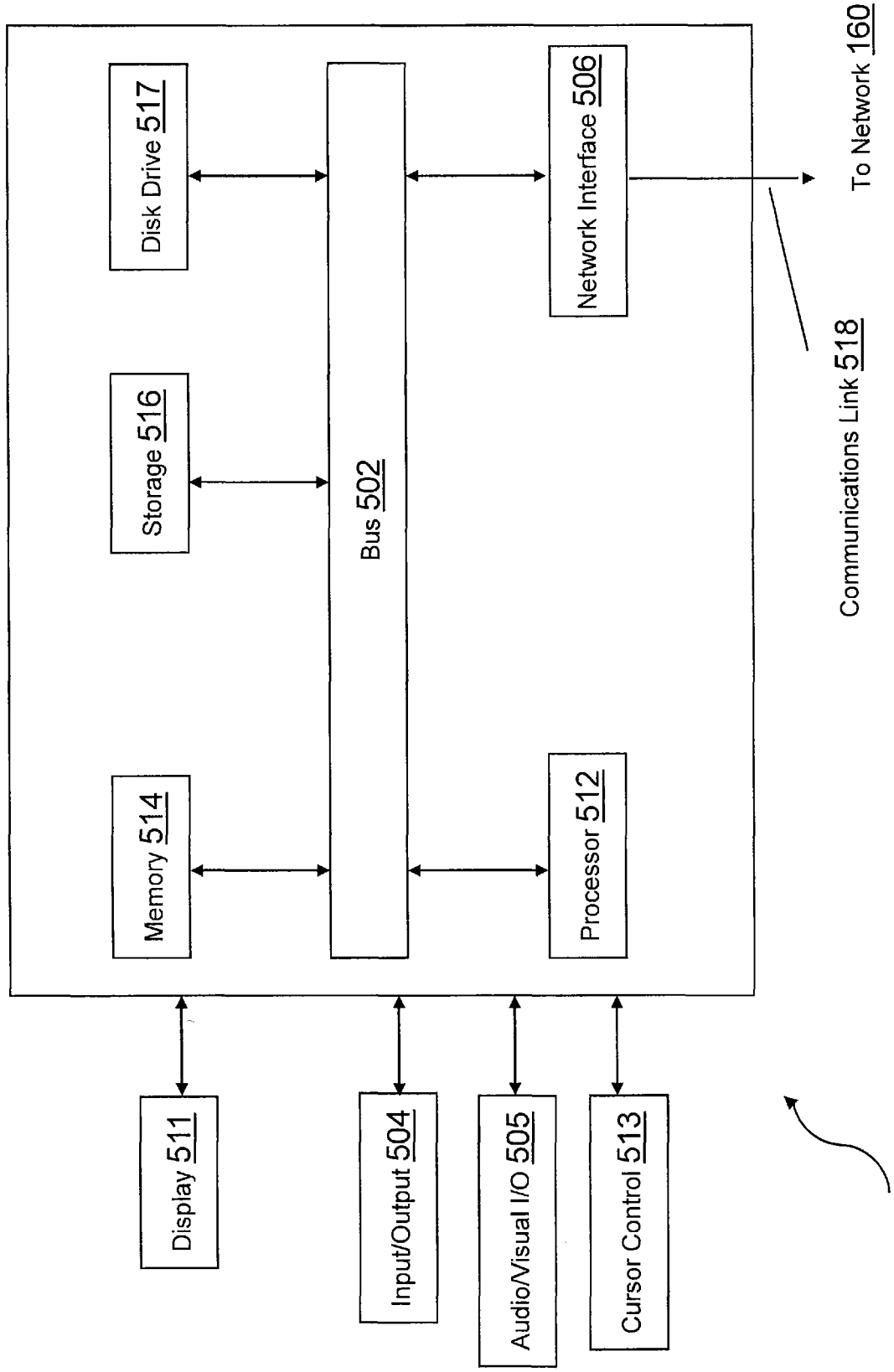
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device system comprising:
   a biometric capture device;
   a non-transitory memory; and
   one or more hardware processors coupled to the non-transitory memory and configured to read instructions from the non-transitory memory to cause the user device system to perform operations comprising:
   receiving image data of a fingerprint captured by the biometric capture device;
   detecting, at a time of capture of the image data, an increased heart rate of a user associated with the user device system using one of the biometric capture device of the user device system or an additional biometric device wirelessly connected to the user device system;
   determining fingerprint input data of the fingerprint that comprises an orientation of the fingerprint and a length of time the fingerprint is on the user device system using at least in part the image data;
   determining an electronic transaction processed using an account associated with the user device system through an application of the user device system;
   determining, based on the increased heart rate and the fingerprint input data of the fingerprint, whether to display a balance and a financial information for the account on a user interface associated with displaying the electronic transaction through the application;
   determining an interface display configuration for the user interface displayed by the user device system based on the determining whether to display the balance and the financial information;
   outputting the user interface based on the interface display configuration;
   detecting a computing action associated with the balance and the financial information that is executed in the application using the user interface;
   determining that the computing action indicates fraud based on the increased heart rate and the fingerprint input data; and
   marking the computing action for reversal based on the determining that the computing action indicates fraud.

2. The user device system of claim 1, wherein prior to determining the interface display configuration, the operations further comprise:
   determining that the orientation of the fingerprint is within a range of orientations,
   wherein the interface display configuration provides full data access to the balance and the financial information through the user interface based on the determination that the orientation is within the range.

3. The user device system of claim 1, wherein prior to determining the interface display configuration, the operations further comprise:
   determining that the orientation of the fingerprint is outside of a range of orientations,
   wherein the interface display configuration provides partial data access to the balance and the financial information through the user interface based on the determination that the orientation is outside the range.

4. The user device system of claim 1, wherein prior to determining the interface display configuration, the operations further comprise:
   determining that the orientation of the fingerprint is within a range of orientations,
   wherein the interface display configuration prevents access to the balance and the financial information through the user interface based on the determination that the orientation is within the range.

5. The user device system of claim 4, wherein the user device system is associated with a second user device system, and wherein the operations further comprise:
  transmitting an alert to the second user device system based on the orientation of the fingerprint being within the range.

6. The user device system of claim 1, wherein prior to the determining the interface display configuration, the operations further comprise:
  connecting to a wearable computing device associated with the user of the user device system; and
  determining user data for the user using the wearable computing device,
  wherein the interface display configuration is further determined based on the user data.

7. The user device system of claim 1, wherein prior to the determining the interface display configuration, the operations further comprise:
  determining a pressure of the fingerprint applied to the biometric capture device,
  wherein the interface display configuration is further determined based on the pressure.

8. The user device system of claim 1, wherein prior to determining the orientation of the fingerprint, the operations further comprise:
  generating a map of the fingerprint using the image data; and
  comparing the map of the fingerprint to stored fingerprint data associated with the user of the user device system,
  wherein the orientation is determined based on the comparing.

9. The user device system of claim 8, wherein the map of the fingerprint comprises curvature information of ridges and grooves of the fingerprint, and wherein the orientation is determined based on the curvature information.

10. The user device system of claim 1, wherein prior to the determining the interface display configuration, the operations further comprise:
  detecting voice data using a microphone of the user device system,
  wherein the interface display configuration is further determined based on the voice data.

11. The user device system of claim 10, wherein the voice data comprises a voice command, and wherein the determining the interface display configuration comprises:
  identifying a requested action for the interface display configuration based on the voice command,
  wherein the user interface is output based on the requested action.

12. The user device system of claim 1, wherein the biometric capture device comprises one of a home screen button having an image capture device, a touch screen interface of the user device system, or an ultrasonic capture device.

13. A method comprising:
  receiving, by a device, an access request to access an application on the device;
  in response to receiving the access request, capturing a first image of a first fingerprint using an input component of the device;
  detecting, at a time of the capturing the first image, an increased heart rate of a user associated with the device using one of the input component of the device or a biometric device wirelessly connected to the device;
  determining fingerprint input data of the first fingerprint that comprises a placement of the first fingerprint on the input component based on the first image and a length of time of the first fingerprint on the input component;
  determining an electronic transaction processed using an account associated with the device through the application of the device;
  determining, based on the increased heart rate and the fingerprint input data of the first fingerprint, whether to display a balance and a financial information for the account on a user interface associated with displaying the electronic transaction through the application;
  determining data accessibility within the application based on the determining whether to display the balance and the financial information;
  outputting data within the application based on the data accessibility and the user interface;
  detecting a computing action associated with the balance and the financial information that is executed in the application using the user interface;
  determining that the computing action indicates fraud based on the increased heart rate and the fingerprint input data; and
  marking the computing action for reversal based on the determining that the computing action indicates fraud.

14. The method of claim 13, wherein the data within the application comprises false application data, and wherein the computing action comprises a request to process the electronic transaction within the application, and wherein the method further comprises:
  alerting an entity associated with the application.

15. The method of claim 13, further comprising:
  capturing a second image of a second fingerprint on the device within a predetermined time of capturing the first image;
  determining that the second fingerprint is unknown to the device; and
  locking at least one of the application or the device based on the determining that the second fingerprint is unknown.

16. The method of claim 13, wherein prior to determining the data accessibility, the method further comprises:
  in response to detecting the first fingerprint, activating at least one of an additional device component of the device or a connected device to the device; and
  capturing additional data associated with the device using the at least one of the additional device component or the connected device,
  wherein the data accessibility is further determined based on the additional data.

17. The method of claim 16, wherein the additional data comprises at least one of a location of the device, an image, voice data, a pressure applied to the device, or a perspiration amount of the user, and wherein the additional device component or the connected device comprises a GPS locator, a camera, a microphone, a pressure sensor, a touch screen interface, or a wearable computing device.

18. A non-transitory machine-readable medium having stored thereon machine-readable instructions executable to cause a machine to perform operations comprising:
  receiving, by a mobile phone device, an unlock request to unlock the mobile phone device;
  capturing fingerprint data of a fingerprint with the unlock request using a biometric input component of the mobile phone device;
  detecting, at a time of the capturing the fingerprint data, an increased heart rate of a user associated with the mobile phone device using one of the biometric input component of the mobile phone device or a biometric device wirelessly connected to the mobile phone device;

determining fingerprint input data of the fingerprint that comprises an orientation of the fingerprint and a length of time of the fingerprint on the mobile phone device during the unlock request based at least in part on the fingerprint data;

determining an electronic transaction processed using an account associated with the mobile phone device through an application of the mobile phone device;

determining, based on the increased heart rate and the fingerprint input data of the fingerprint, whether to display a balance and a financial information for the account on a user interface associated with displaying the electronic transaction through the application;

outputting content on the mobile phone device based on the determining whether to display the balance and the financial information;

detecting a computing action associated with the balance and the financial information that is executed in the application using the user interface;

determining that the computing action indicates fraud based on the increased heart rate and the fingerprint input data; and marking the computing action for reversal based on the determining that the computing action indicates fraud.

19. The non-transitory machine-readable medium of claim 18, wherein the operations further comprise:

determining a first device within a first distance from the mobile phone device; and transmitting a communication to the first device based on the computing action.

20. The non-transitory machine-readable medium of claim 19, wherein the first device comprises one of a plurality of devices associated with a group of users designated by the user of the mobile phone device or by a service provider associated with the mobile phone device.

* * * * *